(12) United States Patent
Son et al.

(10) Patent No.: US 9,932,439 B2
(45) Date of Patent: Apr. 3, 2018

(54) PHOTOSENSITIVE RESIN COMPOSITION AND CURED ARTICLE OF SAME, AND OPTICAL COMPONENT

(71) Applicant: DAICEL CORPORATION, Osaka-shi, Osaka (JP)

(72) Inventors: Tamaki Son, Ohtake (JP); Takashi Kubo, Tokyo (JP)

(73) Assignee: DAICEL CORPORATION, Osaka-Shi (JP)

(*) Notice: Subject to any disclaimer, the term of this patent is extended or adjusted under 35 U.S.C. 154(b) by 0 days.

(21) Appl. No.: 15/023,174

(22) PCT Filed: Sep. 16, 2014

(86) PCT No.: PCT/JP2014/074423
§ 371 (c)(1),
(2) Date: Jun. 24, 2016

(87) PCT Pub. No.: WO2015/041210
PCT Pub. Date: Mar. 26, 2015

(65) Prior Publication Data
US 2016/0289370 A1 Oct. 6, 2016

(30) Foreign Application Priority Data
Sep. 18, 2013 (JP) ................................ 2013-192855

(51) Int. Cl.
| | | |
|---|---|---|
| *C08G 59/24* | (2006.01) | |
| *C09D 5/00* | (2006.01) | |
| *C09D 163/00* | (2006.01) | |
| *C09D 163/08* | (2006.01) | |
| *C08K 3/04* | (2006.01) | |
| *G02B 1/04* | (2006.01) | |
| *C08L 63/00* | (2006.01) | |
| *C08G 59/68* | (2006.01) | |
| *G02B 1/00* | (2006.01) | |
| *G02B 5/00* | (2006.01) | |
| *C09J 163/00* | (2006.01) | |
| *C08G 59/38* | (2006.01) | |

(52) U.S. Cl.
CPC .......... *C08G 59/687* (2013.01); *C08G 59/24* (2013.01); *C08K 3/04* (2013.01); *C08L 63/00* (2013.01); *C09D 5/00* (2013.01); *C09D 163/00* (2013.01); *C09D 163/08* (2013.01); *C09J 163/00* (2013.01); *G02B 1/00* (2013.01); *G02B 1/04* (2013.01); *G02B 5/003* (2013.01)

(58) Field of Classification Search
CPC ...... C08G 59/687; C08G 59/24; C08G 59/38; C09D 5/00; C09D 163/00; C09D 163/08; C08K 3/04; G02B 5/003; G02B 1/04; C08L 63/00
USPC .......... 522/71; 523/400, 427, 468; 528/219, 528/271
See application file for complete search history.

(56) References Cited

U.S. PATENT DOCUMENTS

| | | | |
|---|---|---|---|
| 8,877,878 B2 | 11/2014 | Shinya et al. | |
| 2006/0009547 A1* | 1/2006 | Maeshima | C07D 301/14 523/427 |
| 2009/0131547 A1 | 5/2009 | Maeshima et al. | |
| 2010/0249341 A1 | 9/2010 | Sato et al. | |
| 2011/0192639 A1 | 8/2011 | Shinya et al. | |
| 2011/0200810 A1 | 8/2011 | Kubota | |
| 2012/0262793 A1 | 10/2012 | Yoshikawa et al. | |
| 2013/0183499 A1* | 7/2013 | Kido | H05K 3/0058 428/195.1 |
| 2015/0018447 A1* | 1/2015 | Son | C08G 59/24 522/71 |

FOREIGN PATENT DOCUMENTS

| | | | |
|---|---|---|---|
| CN | 101070373 A | 11/2007 | |
| EP | 2 367 031 A1 | 9/2011 | |
| EP | 2 526 447 A1 | 11/2012 | |
| EP | 2 826 799 A1 | 1/2015 | |
| JP | 9-71636 A | 3/1997 | |
| JP | 2005-187636 A | 7/2005 | |
| JP | 2005-336313 A | 12/2005 | |
| JP | 2006-63261 A | 3/2006 | |
| JP | 2006-99027 A | 4/2006 | |
| JP | 2007-119684 A | 5/2007 | |
| JP | 2008-238417 | * 10/2008 | ............. B29C 59/02 |
| JP | 2008-285679 A | 11/2008 | |

(Continued)

OTHER PUBLICATIONS

International Search Report, issued in PCT/JP2014/074423, dated Oct. 14, 2014.
Written Opinion of the International Searching Authority, issued in PCT/JP2014/074423, dated Oct. 14, 2014.
A Japanese Notification of Reasons for Refusal, dated Nov. 21, 2017, for counterpart Japanese Application No. 2015-537922, as well as an English translation.

*Primary Examiner* — Bijan Ahvazi
(74) *Attorney, Agent, or Firm* — Birch, Stewart, Kolasch & Birch, LLP

(57) ABSTRACT

Provided is a photosensitive resin composition that is, after being applied to an adherend surface, rapidly cured by photoirradiation to form a cured product having excellent light-shielding ability and adhesiveness. The present invention relates to a photosensitive resin composition that includes components as follows:

(A) a cationically polymerizable compound at least including a compound containing an alicyclic epoxy group and devoid of ester bonds;

(B) a photo-cationic polymerization initiator including a cationic moiety and an anionic moiety containing a boron atom; and (C) a light-shielding material.

17 Claims, No Drawings

(56) References Cited

FOREIGN PATENT DOCUMENTS

| JP | 2009-265450 A | 11/2009 |
| JP | 2011-170334 A | 9/2011 |
| JP | 2011-186437 A | 9/2011 |
| TW | 201026711 A1 | 7/2010 |
| WO | WO 2011/090217 A1 | 7/2011 |

* cited by examiner

US 9,932,439 B2

PHOTOSENSITIVE RESIN COMPOSITION AND CURED ARTICLE OF SAME, AND OPTICAL COMPONENT

TECHNICAL FIELD

The present invention relates to: photosensitive resin compositions; cured products thereof; and optical components. More specifically, the present invention relates to a photosensitive resin composition and a cured product thereof, and an optical component including the cured product, where the photosensitive resin composition, when applied to an optical component such as a lens and irradiated with light, can form a light-shielding film or light-shielding layer capable of maintaining an excellent adhesive strength to the optical component. The present application claims the priority of Japanese Patent Application No. 2013-192855 filed Sep. 18, 2013, the contents of which are incorporated herein by reference.

BACKGROUND ART

Portable electronic appliances such as cellular phones and smartphones are now growing in demand. Such electronic appliances each bear a compact and thin imaging unit. The imaging unit generally includes optical components such as a solid-state image sensing device (such as a CCD image sensor or CMOS image sensor) and lenses. Two or more lenses are used for higher resolution, and a light-shielding film is provided between the lenses so as to prevent ghosts and flares caused by undesired light from outside.

Patent Literature (PTL) 1 describes a light-shielding sealing agent that includes a light-shielding material; a curable resin having an unsaturated double bond, such as an epoxy (meth)acrylate or urethane (meth)acrylate; a polymerization initiator; and a thermal curing agent. Disadvantageously, however, the light-shielding material contained in the light-shielding sealing agent impedes ultraviolet irradiation to the inside of the curable resin. The sealing agent, upon curing by ultraviolet irradiation alone, is therefore cured at a low curing rate (is cured slowly) and requires, for example, a long-time heat treatment in addition to the ultraviolet irradiation. Thus, the light-shielding sealing agent requires an excessively long time to be cured.

PTL 2 describes a light-shielding film obtained by curing a light-shielding coating material, where the coating material includes a light-shielding material, an epoxy resin, and an amine curing agent. Unfortunately, however, the light-shielding coating material also fails to be cured rapidly by ultraviolet irradiation and requires an excessively long time to be cured, as with the technology described in PTL 1. Specifically, the light-shielding coating material requires an additional curing process typically of drying at room temperature for 60 minutes and further heating at 80° C. for 120 minutes. In addition, the light-shielding film is affixed to the lenses via an adhesive layer. The resulting assembly of components is, however, demanded to be thinned associated with size reduction and performance improvement of imaging units.

In addition, imaging units to be mounted in portable electronic appliances require reflow heat resistance for efficient mounting.

CITATION LIST

Patent Literature

PTL 1: Japanese Unexamined Patent Application Publication (JP-A) No. 2006-99027
PTL 2: JP-A No. 2011-186437

SUMMARY OF INVENTION

Technical Problem

Accordingly, an object of the present invention is to provide a photosensitive resin composition that can be rapidly cured by photoirradiation after being applied to an adherend surface and can form a cured product having excellent light-shielding ability and adhesiveness.

Another object of the present invention is to provide a photosensitive resin composition that can be rapidly cured by photoirradiation after being applied to an adherend surface and can form a cured product having excellent light-shielding ability, adhesiveness, and reflow heat resistance.

Yet another object of the present invention is to provide a cured product obtained by curing the photosensitive resin composition (cured product of the photosensitive resin composition); and an optical component including the cured product.

Solution to Problem

After intensive investigations to achieve the objects, the inventors have found that a photosensitive resin composition including a specific cationically polymerizable compound, a specific photo-cationic polymerization initiator, and a light-shielding material as essential components can be rapidly cured by photoirradiation and can form a cured product having excellent light-shielding ability and adhesiveness.

The inventors have also found that a specific hydroxyl-containing compound, when used as a curable compound in combination with the cationically polymerizable compound in the resin composition, can help the resin composition to have still better curability and better adhesiveness (particularly adhesiveness to glass); that the resulting resin composition can impart flexibility to a cured product obtained therefrom and thereby allow the cured product to have good conformability to an adherend surface shape and to resist peeling off from the adherend surface even upon a reflow process.

The present invention has been made based on these findings.

Specifically, the present invention provides, in an aspect, a photosensitive resin composition that includes components as follows:

(A) a cationically polymerizable compound at least including a compound containing an alicyclic epoxy group and devoid of ester bonds;
(B) a photo-cationic polymerization initiator including a cationic moiety and an anionic moiety containing a boron atom; and
(C) a light-shielding material.

In addition, the present invention provides the photosensitive resin composition, wherein the compound containing an alicyclic epoxy group and devoid of ester bonds in the component (A) is a compound represented by Formula (a-1):

[Chem. 1]

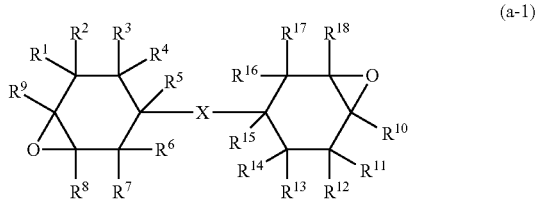

(a-1)

wherein $R^1$ to $R^{18}$ are identical or different and are independently selected from a hydrogen atom, a halogen atom, a hydrocarbon group optionally containing at least one of oxygen and halogen, and an optionally substituted alkoxy group; and X is selected from a single bond and a linkage group (excluding ester-bond-containing linkage groups).

In addition, the present invention provides the photosensitive resin composition, wherein the anionic moiety of the component (B) is an anion represented by Formula (1):

[Chem. 2]

$$[(R)_n BF_{4-n}]^- \quad (1)$$

wherein R represents a monovalent hydrocarbon group or a monovalent fluorinated hydrocarbon group; and n represents an integer from 1 to 4.

In addition, the present invention provides the photosensitive resin composition, wherein the anionic moiety of the component (B) is an anion represented by Formula (2):

[Chem. 3]

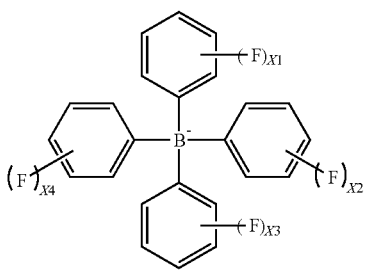

(2)

wherein X1 to X4 are identical or different, each represent an integer from 0 to 5, and the total of all of X1 to X4 is one or more.

In addition, the present invention provides the photosensitive resin composition, wherein the component (C) is a carbon black.

The present invention provides, in another aspect, a cured product of the photosensitive resin composition.

In addition and advantageously, the present invention provides an optical component including the cured product.

Specifically, the present invention relates to the following.

[1] A photosensitive resin composition that includes components as follows:

(A) a cationically polymerizable compound at least including a compound (alicyclic epoxy compound) containing an alicyclic epoxy group and devoid of ester bonds;

(B) a photo-cationic polymerization initiator including a cationic moiety and an anionic moiety containing a boron atom; and (C) a light-shielding material.

[2] The photosensitive resin composition according to [1], wherein the alicyclic epoxy compound in the component (A) is a compound containing one to six alicyclic epoxy groups per one molecule.

[3] The photosensitive resin composition according to [1] or [2], wherein the compound (alicyclic epoxy compound) containing an alicyclic epoxy group and devoid of ester bonds in the component (A) is a compound represented by Formula (a-1):

[Chem. 4]

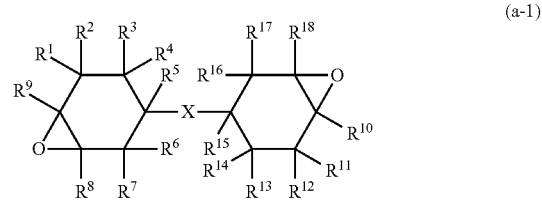

(a-1)

wherein $R^1$ to $R^{18}$ are identical or different and are independently selected from a hydrogen atom, a halogen atom, a hydrocarbon group optionally containing at least one of oxygen and halogen, and an optionally substituted alkoxy group; and X is selected from a single bond and a linkage group (excluding ester-bond-containing linkage groups).

[4] The photosensitive resin composition according to any one of [1] to [3], wherein the component (A) includes one or more other cationically polymerizable compounds in addition to the alicyclic epoxy compound(s).

[5] The photosensitive resin composition according to [4], wherein the other cationically polymerizable compound is at least one selected from the group consisting of an epoxy compound other than the alicyclic epoxy compounds, a compound having one or more oxetanyl groups per molecule, and a compound having one or more vinyl ether groups per molecule.

[6] The photosensitive resin composition according to [5], wherein the epoxy compound other than the alicyclic epoxy compounds is a compound represented by Formula (a-4) mentioned below.

[7] The photosensitive resin composition according to any one of [1] to [6], wherein an epoxy compound containing one or more ester bonds per molecule is used in a content of 40 percent by weight or less, based on the total amount (100 percent by weight) of the component (A).

[8] The photosensitive resin composition according to any one of [1] to [7], wherein the content (amount) of a compound (iii) containing an alicyclic epoxy group and an ester bond is 0 to 12 percent by weight, based on the total amount (100 percent by weight) of the component (A).

[9] The photosensitive resin composition according to any one of [1] to [8], wherein the difference between the content of the alicyclic epoxy compound and the content of the compound containing an alicyclic epoxy group and an ester bond ([Content (parts by weight) of alicyclic epoxy compound]−[Content (parts by weight) of compound containing an alicyclic epoxy group and an ester bond]) is greater than 0 part by weight.

[10] The photosensitive resin composition according to any one of [1] to [9], wherein the component (A) includes a compound having one or more oxetanyl groups per molecule.

[11] The photosensitive resin composition according to any one of [1] to [10], wherein the content of the component (A) is 20 to 99 percent by weight, based on the total amount (100 percent by weight) of the photosensitive resin composition.

[12] The photosensitive resin composition according to any one of [1] to [11], wherein when the photosensitive resin composition includes the below-described component (D), the content of the component (A) is 20 to 90 percent by weight, based on the total amount (100 percent by weight) of the photosensitive resin composition.

[13] The photosensitive resin composition according to any one of [1] to [11], wherein when the photosensitive resin composition does not include the below-described component (D), the total content (amount) of a curable compound is 75 to 99 percent by weight, based on the total amount (100 percent by weight) of the photosensitive resin composition.

[14] The photosensitive resin composition according to any one of [1] to [13], the content of the alicyclic epoxy compound(s) is 20 to 90 percent by weight, based on the total amount (100 percent by weight) of the component (A).

[15] The photosensitive resin composition according to any one of [4] to [14], wherein the content of the other cationically polymerizable compound is 10 to 80 percent by weight, based on the total amount (100 percent by weight) of the component (A).

[16] The photosensitive resin composition according to any one of [5] to [15], wherein the content of the compound having one or more oxetanyl groups per molecule is 1 to 80 percent by weight, based on the total amount (100 percent by weight) of the component (A).

[17] The photosensitive resin composition according to any one of [1] to [16], wherein the anionic moiety of the component (B) is an anion represented by Formula (1) mentioned above, wherein R represents a monovalent hydrocarbon group or a monovalent fluorinated hydrocarbon group; and n represents an integer from 1 to 4.

[18] The photosensitive resin composition according to any one of [1] to [17], wherein the anionic moiety of the component (B) is an anion represented by Formula (2) mentioned above, wherein X1 to X4 are identical or different, each represent an integer from 0 to 5; and the total of all of X1 to X4 is one or more.

[19] The photosensitive resin composition according to any one of [1] to [18], wherein the content of the component (B) is 0.1 to 30 parts by weight, per 100 parts by weight of the component (A).

[20] The photosensitive resin composition according to any one of [1] to [19], wherein the average particle diameter (as determined by a dynamic light scattering measurement) of the component (C) is 5 to 500 nm.

[21] The photosensitive resin composition according to any one of [1] to [20], wherein the content of the component (C) is 0.5 to 50 parts by weight, per 100 parts by weight of the total amount (when the component (D) is included, the total amount of the component (A) and the component (D)) of the curable components.

[22] The photosensitive resin composition according to any one of [1] to [21], wherein the content (amount) of the component (C) is 0.5 to 20 percent by weight, based on the total amount (100 percent by weight) of the photosensitive resin composition.

[23] The photosensitive resin composition according to any one of [1] to [22], wherein the component (C) is a carbon black.

[24] The photosensitive resin composition according to any one of [1] to [23], further including a component as follows:

(D) a hydroxyl-containing compound having a molecular weight of 500 or more.

[25] The photosensitive resin composition according to [24], wherein the number of the hydroxyl groups contained in one molecule of the component (D) is two or more.

[26] The photosensitive resin composition according to [24] or [25], wherein the component (D) is at least one selected from the group consisting of a hydroxyl-containing compound having a polycarbonate skeleton in the molecule, a hydroxyl-containing compound having a polyester skeleton in the molecule, and a hydroxyl-containing compound having a polydiene skeleton in the molecule.

[27] The photosensitive resin composition according to any one of [24] to [26], including as the component (D) the hydroxyl-containing compound having a polycarbonate skeleton in the molecule and the hydroxyl-containing compound having a polydiene skeleton in the molecule, in combination.

[28] The photosensitive resin composition according to any one of [24] to [27], the amount of the component (D) is 5 to 80 percent by weight, based on the total amount (when the component (D) is included, the total amount of the component (A) and the component (D)) (100 percent by weight) of the curable components included in the photosensitive resin composition.

[29] The photosensitive resin composition according to [27] or [28], wherein the ratio (in weight ratio) of the hydroxyl-containing compound having a polycarbonate skeleton in the molecule to the hydroxyl-containing compound having a polydiene skeleton in the molecule, when used in combination, is 1/99 to 99/1.

[30] The photosensitive resin composition according to any one of [1] to [29], wherein the viscosity at 25° C. is 100 to 100000 mPa·s.

[31] A cured product obtained by curing the photosensitive resin composition according to any one of [1] to [30].

[32] The cured product according to [31], wherein the adhesive strength (to a glass plate) is 1 MPa or more upon irradiation with an ultraviolet ray at 200 mW/cm$^2$ for 15 seconds.

[33] The cured product according to [31] or [32], wherein the light-shielding rate of a molded product (cured product) having a thickness of 20 μm is 85% or more.

[34] The cured product according to any one of [31] to [33], wherein the total luminous transmittance of a molded product (cured product) having a thickness of 10 μm is 0 to 1.5%.

[35] The cured product according to any one of [31] to [34], wherein the glass transition temperature (Tg) is 70 to 250° C.

[36] The cured product according to any one of [31] to [35], wherein the storage elastic modulus at 25° C. is 0.1 to 10 GPa.

[37] An optical component including the cured product according to any one of [31] to [36].

[38] The optical component according to [37], wherein the thickness of the cured product (for example, the thickness of a light-shielding film or a light-shielding layer) is 50 μm or less.

Advantageous Effects of Invention

The photosensitive resin composition according to the present invention has the configuration, is thereby rapidly cured by photoirradiation after being applied to an adherend surface, and can form a cured product having excellent light-shielding ability and adhesiveness. The photosensitive resin composition according to the present invention, particularly when further including a hydroxyl-containing compound having a molecular weight of 500 or more, can be rapidly cured by photoirradiation after being applied to an adherend surface and can form a cured product having excellent light-shielding ability, adhesiveness, and reflow heat resistance. Assume that the photosensitive resin composition according to the present invention is used as an adhesive and applied to between two or more lenses forming an imaging unit of an electronic appliance. In this case, the photosensitive resin composition can rapidly bond and fix the lenses with each other by photoirradiation and can simultaneously form a light-shielding layer between the lenses. In addition, the photosensitive resin composition according to the present invention enables mounting of such a component typically onto a circuit board by solder reflow (reflow soldering). For these reasons, the photosensitive resin composition according to the present invention, when used to manufacture an electronic appliance, can shorten working processes and provide significantly better productivity. While a light-shielding film is applied to a lens via an adhesive layer according to customary techniques, the photosensitive resin composition according to the present invention can form a cured product acting both as a light-shielding film and as an adhesive layer and can thereby help an imaging unit to be further thinned.

DESCRIPTION OF EMBODIMENTS

The photosensitive resin composition according to the present invention includes components (A), (B), and (C) as essential components. The photosensitive resin composition according to the present invention preferably further includes the below-described component (D) from the viewpoint of reflow heat resistance.

(A) a cationically polymerizable compound at least including a compound containing an alicyclic epoxy group and devoid of ester bonds;

(B) a photo-cationic polymerization initiator including a cationic moiety and an anionic moiety containing a boron atom; and (C) a light-shielding material.

Component (A)

The component (A) for use in the present invention is one of curable components (curable compounds) contained the photosensitive resin composition and includes one or more cationically polymerizable compounds including a compound containing at least one alicyclic epoxy group per one molecule and devoid of ester bonds. This compound is hereinafter also referred to as an "alicyclic epoxy compound". As used herein the term "alicyclic epoxy group" refers to a group formed by one oxygen atom and adjacent two carbon atoms constituting an alicycle. Such alicyclic epoxy compounds have excellent curability.

The alicyclic epoxy group is exemplified by an epoxy group formed by an oxygen atom and adjacent two carbon atoms constituting a cyclohexane ring.

The alicyclic epoxy compound may have one or more (e.g., one to six) alicyclic epoxy groups and has preferably two to five alicyclic epoxy groups, and particularly preferably two alicyclic epoxy groups, per molecule.

The alicyclic epoxy compound is exemplified by compounds represented by Formula (a-1) below. In Formula (a-1), $R^1$ to $R^{18}$ are identical or different and are independently selected from a hydrogen atom; a halogen atom; a hydrocarbon group optionally containing at least one of oxygen and halogen; and an optionally substituted alkoxy group; and X represents a single bond or a linkage group (excluding ester-bond-containing linkage groups).

[Chem. 5]

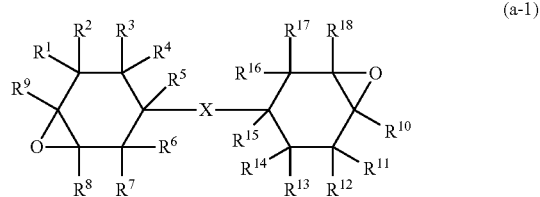

The halogen atom as $R^1$ to $R^{18}$ is exemplified by fluorine, chlorine, bromine, and iodine atoms.

The hydrocarbon group as $R^1$ to $R^{18}$ is exemplified by aliphatic hydrocarbon groups (e.g., alkyl groups, alkenyl groups, and alkynyl groups), alicyclic hydrocarbon groups, aromatic hydrocarbon groups, and groups each including two or more of them bonded to each other.

The alkyl groups are exemplified by $C_1$-$C_{20}$ alkyl groups such as methyl, ethyl, propyl, isopropyl, butyl, hexyl, octyl, isooctyl, decyl, and dodecyl groups, of which $C_1$-$C_{10}$ alkyl groups are preferred, and $C_1$-$C_4$ alkyl groups are particularly preferred. The alkenyl groups are exemplified by $C_2$-$C_{20}$ alkenyl groups such as vinyl, allyl, methallyl, 1-propenyl, isopropenyl, 1-butenyl, 2-butenyl, 3-butenyl, 1-pentenyl, 2-pentenyl, 3-pentenyl, 4-pentenyl, and 5-hexenyl groups, of which $C_2$-$C_{10}$ alkenyl groups are preferred, and $C_2$-$C_4$ alkenyl groups are particularly preferred. The alkynyl groups are exemplified by $C_2$-$C_{20}$ alkynyl groups such as ethynyl and propynyl groups, of which $C_2$-$C_{10}$ alkynyl groups are preferred, and $C_2$-$C_4$ alkynyl groups are particularly preferred.

The alicyclic hydrocarbon groups are exemplified by $C_3$-$C_{12}$ cycloalkyl groups such as cyclopropyl, cyclobutyl, cyclopentyl, cyclohexyl, and cyclododecyl groups; $C_3$-$C_{12}$ cycloalkenyl groups such as cyclohexenyl group; and $C_4$-$C_{15}$ bridged hydrocarbon groups such as bicycloheptyl and bicycloheptenyl groups.

The aromatic hydrocarbon groups are exemplified by $C_6$-$C_{14}$ aryl groups such as phenyl and naphthyl groups, of which $C_6$-$C_{10}$ aryl groups are preferred.

Of the groups each including two or more groups selected from the aliphatic hydrocarbon groups, alicyclic hydrocarbon groups, and aromatic hydrocarbon groups bonded to each other, groups including an aliphatic hydrocarbon group and an alicyclic hydrocarbon group bonded to each other are exemplified by $C_3$-$C_{12}$ cycloalkyl-$C_1$-$C_{20}$ alkyl groups such as cyclohexylmethyl group; and $C_1$-$C_{20}$ alkyl-$C_3$-$C_{12}$ cycloalkyl groups such as methylcyclohexyl group. Groups including an aliphatic hydrocarbon group and an aromatic hydrocarbon group bonded to each other are exemplified by $C_7$-$C_{18}$ aralkyl groups such as benzyl group and phenethyl group, of which $C_7$-$C_{10}$ aralkyl groups are preferred; $C_6$-$C_{14}$ aryl-$C_2$-$C_{20}$ alkenyl groups such as cinnamyl group; $C_1$-$C_{20}$ alkyl-substituted $C_6$-$C_{14}$ aryl groups such as tolyl group; and $C_2$-$C_{20}$ alkenyl-substituted $C_6$-$C_{14}$ aryl groups such as styryl group.

The hydrocarbon group optionally containing at least one of oxygen and halogen as $R^1$ to $R^{18}$ is exemplified by groups corresponding to the hydrocarbon groups, except with at least one hydrogen atom thereof being substituted with an-oxygen-containing group or a halogen-containing group. The oxygen-containing group is exemplified by hydroxyl group; hydroperoxy group; $C_1$-$C_{10}$ alkoxy groups such as methoxy, ethoxy, propoxy, isopropyloxy, butoxy, and isobutyloxy groups; $C_2$-$C_{10}$ alkenyloxy groups such as allyloxy group; $C_6$-$C_{14}$ aryloxy groups (e.g., tolyloxy and naphthyloxy groups) which may have one or more substituents selected from $C_1$-$C_{10}$ alkyl, $C_2$-$C_{10}$ alkenyl, halogen, and $C_1$-$C_{10}$ alkoxy; $C_7$-$C_{18}$ aralkyloxy groups such as benzyloxy and phenethyloxy groups; $C_1$-$C_{10}$ acyloxy groups such as acetyloxy, propionyloxy, (meth)acryloyloxy, and benzoyloxy groups; $C_1$-$C_{10}$ alkoxy-carbonyl groups such as methoxycarbonyl, ethoxycarbonyl, propoxycarbonyl, and butoxycarbonyl groups; $C_6$-$C_{14}$ aryloxy-carbonyl groups (e.g., phenoxycarbonyl, tolyloxycarbonyl, and naphthyloxycarbonyl groups) which may have one more substituents selected from $C_1$-$C_{10}$ alkyl, $C_2$-$C_{10}$ alkenyl, halogen, and $C_1$-$C_{10}$ alkoxy; $C_7$-$C_{18}$ aralkyloxy-carbonyl groups such as benzyloxycarbonyl group; epoxy-containing groups such as glycidyloxy group; oxetanyl-containing groups such as ethyloxetanyloxy group; $C_1$-$C_{10}$ acyl groups such as acetyl, propionyl, and benzoyl groups; isocyanato group; sulfo group; carbamoyl group; oxo group; and groups each including two or more of them bonded to each other with or without the medium typically of $C_1$-$C_{10}$ alkylene. The halogen-containing group is exemplified by fluorine, chlorine, bromine, and iodine atoms.

The alkoxy group as $R^1$ to $R^{18}$ is exemplified by $C_1$-$C_{10}$ alkoxy groups such as methoxy, ethoxy, propoxy, isopropyloxy, butoxy, and isobutyloxy groups.

The substituents which the alkoxy group may have are exemplified by halogen atoms, hydroxyl, $C_1$-$C_{10}$ alkoxy, $C_2$-$C_{10}$ alkenyloxy, $C_6$-$C_{14}$ aryloxy, $C_1$-$C_{10}$ acyloxy, mercapto, $C_1$-$C_{10}$ alkylthio, $C_2$-$C_{10}$ alkenylthio, $C_6$-$C_{14}$ arylthio, $C_7$-$C_{18}$ aralkylthio, carboxy, $C_1$-$C_{10}$ alkoxycarbonyl, $C_6$-$C_{14}$ aryloxycarbonyl, $C_7$-$C_{18}$ aralkyloxy-carbonyl, amino, mono- or di-($C_1$-$C_{10}$ alkyl)amino, $C_1$-$C_{10}$ acylamino, epoxy-containing groups, oxetanyl-containing groups, $C_1$-$C_{10}$ acyl, and oxo groups, and groups each including two or more of them bonded to each other with or without the medium typically of $C_1$-$C_{10}$ alkylene.

Among them, hydrogen atoms are preferred as $R^1$ to $R^{18}$.

X in Formula (a-1) represents a single bond or a linkage group (a divalent group having one or more atoms). However, a group containing an ester bond is excluded from the linkage group. The linkage group is exemplified by divalent hydrocarbon groups, carbonyl group, ether bond, amido group, and groups including two or more of them linked to each other. The divalent hydrocarbon groups are exemplified by linear or branched $C_1$-$C_{18}$ alkylene groups such as methylene, methylmethylene, dimethylmethylene, ethylene, propylene, and trimethylene groups; and divalent $C_3$-$C_{12}$ cycloalkylene and divalent $C_3$-$C_{12}$ cycloalkylidene groups, such as 1,2-cyclopentylene, 1,3-cyclopentylene, cyclopentylidene, 1,2-cyclohexylene, 1,3-cyclohexylene, 1,4-cyclohexylene, and cyclohexylidene groups.

Of the compounds represented by Formula (a-1), particularly preferred is 3,4,3',4'-diepoxybicyclohexyl, because this compound has small steric hindrance and allows a curing reaction to proceed rapidly by photoirradiation.

The alicyclic epoxy compound is further exemplified by compounds represented by Formulae (a-2) and (a-3):

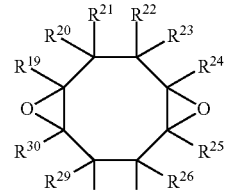

(a-2)

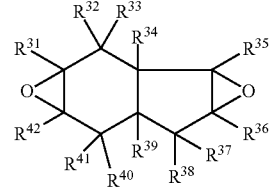

(a-3)

In Formula (a-2), $R^{19}$ to $R^{30}$ are independently selected from a hydrogen atom; a halogen atom; a hydrocarbon group optionally containing at least one of oxygen and halogen; and an optionally substituted alkoxy group. $R^{19}$ to $R^{30}$ may be identical or different. $R^{19}$ to $R^{30}$ are specifically exemplified as with $R^1$ to $R^{18}$ in Formula (a-1). Among them, preferably at least part of, and particularly preferably all of $R^{19}$ to $R^{30}$ are hydrogen atoms.

In Formula (a-3), $R^{31}$ to $R^{42}$ are independently selected from a hydrogen atom; a halogen atom; a hydrocarbon group optionally containing at least one of oxygen and halogen; and an optionally substituted alkoxy group. $R^{31}$ to $R^{42}$ may be identical or different. $R^{31}$ to $R^{42}$ are specifically exemplified as with $R^1$ to $R^{18}$ in Formula (a-1). Among them, preferably at least part of, and particularly preferably all of $R^{31}$ to $R^{42}$ are hydrogen atoms.

Any of the compounds represented by Formula (a-1) is preferred as the alicyclic epoxy compound.

The alicyclic epoxy compound can be produced typically by preparing a corresponding olefinic compound as an olefinic compound having a carbon-carbon unsaturated double bond in the same number as with the alicyclic epoxy group of the alicyclic epoxy compound; and epoxidizing the carbon-carbon unsaturated double bond(s) of the olefinic compound. An epoxidation reaction can be performed according to a known or customary procedure. The alicyclic epoxy compound may also be any of commercially available alicyclic epoxy compounds.

Typically, a compound represented by Formula (a-1) can be produced by epoxidizing an olefin represented by Formula (a-1'). $R^1$ to $R^{18}$ and X in Formula (a-1') are as with those in Formula (a-1).

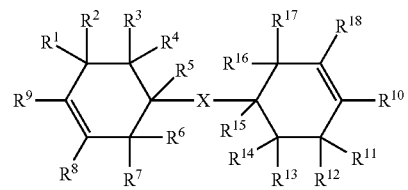

(a-1')

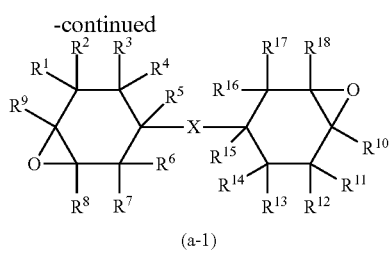

(a-1)

A compound represented by Formula (a-2) can be produced typically by preparing an olefin represented by Formula (a-2') as an unsaturated compound having a cyclooctadiene skeleton; and oxidizing (epoxidizing) the olefin. $R^{19}$ to $R^{30}$ in Formula (a-2') are as with those in Formula (a-2).

[Chem. 9]

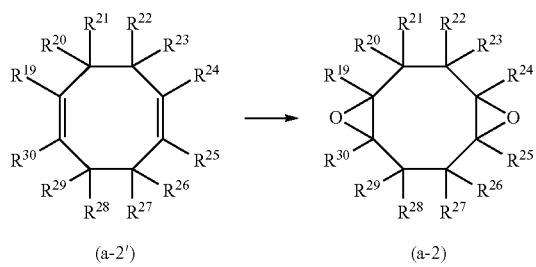

Likewise, a compound represented by Formula (a-3) can be produced typically by preparing an olefin represented by Formula (a-3') as an unsaturated compound having a tetrahydroindene skeleton; and oxidizing (epoxidizing) the olefin. $R^{31}$ to $R^{42}$ in Formula (a-3') are as with those in Formula (a-3).

[Chem. 10]

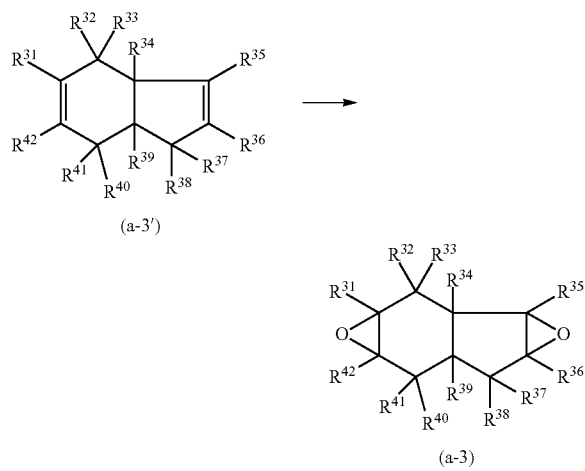

An epoxidizing agent usable in the epoxidation reaction is exemplified by known or customary oxidizing agents such as organic peroxycarboxylic acids and hydroperoxides. The organic peroxycarboxylic acids are exemplified by performic acid, peracetic acid, perpropionic acid, perbenzoic acid, trifluoroperacetic acid, and perphthalic acid. The hydroperoxides are exemplified by hydrogen peroxide, tert-butyl hydroperoxide, and cumene hydroperoxide.

Each of different alicyclic epoxy compounds may be used alone or in combination in the component (A).

The component (A) may further include one or more other cationically polymerizable compounds in addition to the alicyclic epoxy compound(s). Such other cationically polymerizable compounds are exemplified by epoxy compounds other than the alicyclic epoxy compounds; compounds having one or more oxetanyl groups per molecule; and compounds having one or more vinyl ether groups per molecule. Each of them may be used alone or in combination.

The epoxy compounds other than the alicyclic epoxy compounds are exemplified by epoxy compounds having an alicyclic structure in a molecule; aromatic glycidyl ether epoxy compounds such as bisphenol-A epoxy compounds and bisphenol-F epoxy compounds; aliphatic glycidyl ether epoxy compounds such as mono- or poly-glycidyl ethers of aliphatic polyhydric alcohols; glycidyl ester epoxy compounds; and glycidylamine epoxy compounds. The epoxy compound other than the alicyclic epoxy compounds does not include the compounds corresponding to the below-described component (D).

The epoxy compounds having an alicyclic structure in a molecule include (i) compounds having an epoxy group directly bonded to an alicycle via a single bond, such as compounds represented by Formula (a-4) below; (ii) hydrogenated aromatic glycidyl ether epoxy compounds obtained by hydrogenating corresponding aromatic glycidyl ether epoxy compounds; and (iii) compounds containing an alicyclic epoxy group and an ester bond.

[Chem. 11]

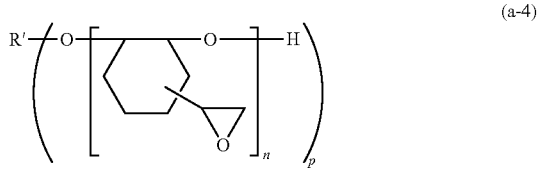

(a-4)

In Formula (a-4), R' represents a group corresponding to a p-hydric alcohol, except for removing —OH in the number of p from its structural formula; and p and n each represent a natural number. The numbers p and n are preferably from 1 to 6 and from 1 to 30, respectively. The p-hydric alcohol $[R'—(OH)_p]$ is exemplified by $C_{1-15}$ polyhydric alcohols such as 2,2-bis(hydroxymethyl)-1-butanol. When p is 2 or more, the number "n" in the outer brackets in p occurrences may be identical or different. Preferred examples of the compounds represented by Formula (a-4) include 1,2-epoxy-4-(2-oxiranyl)cyclohexane adduct of 2,2-bis(hydroxymethyl)-1-butanol, such as a product under the trade name of EHPE3150 (Daicel Corporation).

The hydrogenated aromatic glycidyl ether epoxy compounds (ii) obtained by hydrogenating aromatic glycidyl ether epoxy compounds are exemplified by hydrogenated aromatic glycidyl ether epoxy compounds obtained by hydrogenating aromatic glycidyl ether epoxy compounds. The hydrogenated aromatic glycidyl ether epoxy compounds are exemplified by hydrogenated bisphenol-A epoxy compounds as compounds obtained by hydrogenating bisphenol-A epoxy compounds, such as 2,2-bis[4-(2,3-epoxypropoxy)cyclohexyl]propane, 2,2-bis[3,5-dimethyl-4-(2,3-epoxypropoxy)cyclohexyl]propane, and polymers of these compounds; hydrogenated bisphenol-F epoxy compounds as compounds obtained by hydrogenating bisphenol-F epoxy compounds, such as bis[o,o-(2,3-epoxypropoxy)cyclohexyl]methane, bis[o,p-(2,3-epoxypropoxy)cyclohexyl]methane, bis[p,p-(2,3-epoxypropoxy)cyclohexyl]methane, bis[3,5-dimethyl-4-(2,3-epoxypropoxy)cyclohexyl]methane, and polymers of these compounds; hydrogenated bisphenol epoxy compounds; hydrogenated phenol-novolac epoxy compounds; hydrogenated cresol-novolac epoxy compounds; hydrogenated cresol-novolac epoxy compounds derived from bisphenol-A; hydrogenated naphthalene epoxy compounds; and hydrogenated epoxy compounds obtained by hydrogenating epoxy compounds derived from trisphenolmethane. Among them, epoxy compounds obtained by hydrogenating bisphenol-A epoxy compounds are particularly preferred. The hydrogenated aromatic glycidyl ether epoxy compounds are also available as commercial products typically under the trade name of YX8000 (Mitsubishi Chemical Corporation).

The compounds (iii) containing an alicyclic epoxy group and an ester bond are specifically exemplified by compounds represented by Formula (a-5):

[Chem. 12]

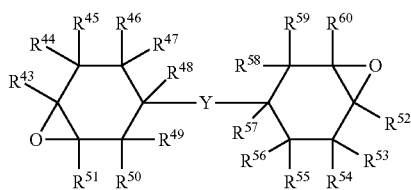

(a-5)

In Formula (a-5), $R^{43}$ to $R^{60}$ are independently selected from a hydrogen atom; a halogen atom; a hydrocarbon group optionally containing at least one of oxygen and halogen; and an optionally substituted alkoxy group. $R^{43}$ to $R^{60}$ may be identical or different. Examples of $R^{43}$ to $R^{60}$ are as with $R^1$ to $R^{18}$ in Formula (a-1). Among them, preferably at least part of, and particularly preferably all of $R^{43}$ to $R^{60}$ are hydrogen atoms.

Y in Formula (a-5) represents a linkage group (divalent group containing at least one atom) containing an ester bond. The linkage group containing an ester bond is exemplified by ester group (ester bond itself); and groups (divalent groups including an ester bond) each including one or more linkage groups linked via one or more ester bonds, where the linkage groups (divalent groups each containing at least one atom) are exemplified by divalent hydrocarbon groups, carbonyl group, ether bond, amido group, and groups each including two or more of them linked to each other.

The compounds represented by Formula (a-5) are specifically exemplified by compounds represented by Formula (a-5-1) to (a-5-7) as follows. In Formula (a-5-4), m represents an integer from 1 to 30. In Formulae (a-5-6) and (a-5-7), n1 to n6 each represent an integer from 1 to 30.

[Chem. 13]

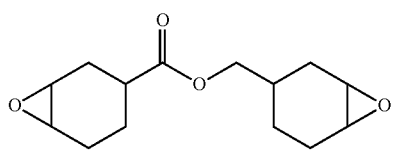

(a-5-1)

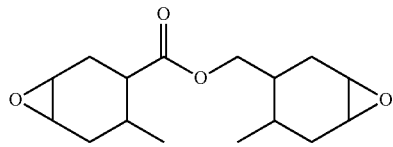

(a-5-2)

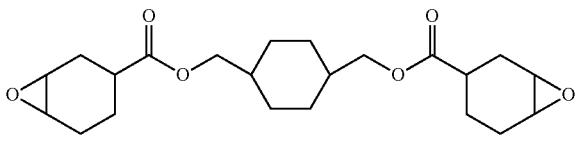

(a-5-3)

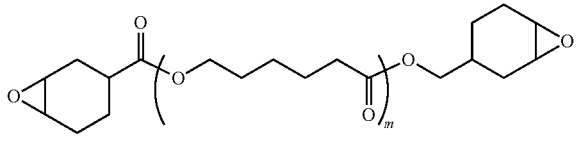

(a-5-4)

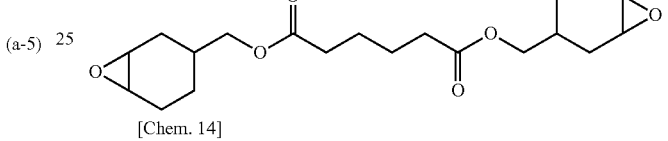

(a-5-5)

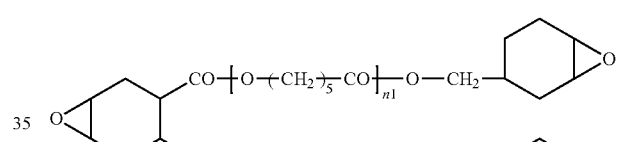

[Chem. 14]

(a-5-6)

(a-5-7)

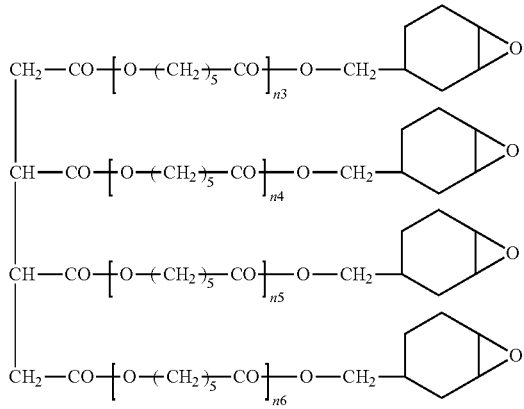

Of the epoxy compounds other than the alicyclic epoxy compounds, preferred are epoxy compounds each having one or more alicyclic structures per molecule and devoid of aromatic ring structures and ester bonds. This is because these epoxy compounds offer excellent curability and can give a cured product having excellent heat resistance, light resistance (lightfastness), and water proofness. An epoxy compound containing one or more ester bonds per molecule, when used as an epoxy compound other than the alicyclic epoxy compounds, may be used in a content of preferably 40 percent by weight or less, more preferably 30 percent by weight or less, particularly preferably less than 10 percent by weight, and most preferably less than 5 percent by weight, based on the total amount (100 percent by weight) of the component (A). The epoxy compound containing one or more ester bonds per molecule, if used in a content greater than the range, may cause the resin composition to have inferior curability and to a cured product having insufficient heat resistance. Such an epoxy compound containing one or more ester bonds per molecule is susceptible to hydrolysis and may often give a cured product having insufficient water proofness.

The compound(s) (iii) containing an alicyclic epoxy group and an ester bond may be used in a content (amount) not critical, but preferably 12 percent by weight or less (e.g., 0 to 12 percent by weight), more preferably 8 percent by weight or less, furthermore preferably 5 percent by weight or less, and particularly preferably 3 percent by weight or less, based on the total amount (100 percent by weight) of the component (A). The compound(s) (iii), if used in a content greater than 12 percent by weight, may cause the photosensitive resin composition to offer insufficient curability in some shapes and thicknesses of the cured product to be formed.

In an embodiment, the photosensitive resin composition according to the present invention includes the compound(s) (iii) containing an alicyclic epoxy group and an ester bond. Particularly in this embodiment, the content (part by weight) of the alicyclic epoxy compound(s) is preferably greater than the content (part by weight) of the compound(s) (iii), namely, the two contents preferably meet the expression:

[Content of alicyclic epoxy compound(s)]>[Content of compound(s)(iii)containing an alicyclic epoxy group and an ester bond]

Specifically, the difference between the content of the alicyclic epoxy compound(s) and the content of the compound(s) (iii) containing an alicyclic epoxy group and an ester bond ([Content (part by weight) of alicyclic epoxy compound(s)]−[Content (part by weight) of compound(s) (iii) containing an alicyclic epoxy group and an ester bond] is preferably greater than 0 part by weight, more preferably 5 parts by weight or more, and furthermore preferably 10 parts by weight or more. The photosensitive resin composition, if having a difference in contents of 0 part by weight or less, may have inferior curability and may readily undergo curing failure.

The compounds having one or more oxetanyl groups per molecule are exemplified by 3,3-bis(vinyloxymethyl)oxetane, 3-ethyl-3hydroxymethyloxetane, 3-ethyl-3-(2-ethylhexyloxymethyl)oxetane, 3-ethyl-3-(hydroxymethyl)oxetane, 3-ethyl-3-[(phenoxy)methyl]oxetane, 3-ethyl-3-(hexyloxymethyl)oxetane, 3-ethyl-3-(chloromethyl)oxetane, 3,3-bis(chloromethyl)oxetane, 1,4-bis[(3-ethyl-3-oxetanylmethoxy)methyl]benzene, bis([1-ethyl (3-oxetanyl)]methyl) ether, 4,4'-bis[(3-ethyl-3-oxetanyl) methoxymethyl]bicyclohexyl, 1,4-bis[(3-ethyl-3-oxetanyl) methoxymethyl]cyclohexane, 1,4-bis([(3-ethyl-3-oxetanyl) methoxy]methyl)benzene, 3-ethyl-3-([(3-ethyloxetan-3-yl) methoxy]methyl)oxetane, and xylylene bisoxetane. The compounds for use herein are also available as commercial products typically under the trade names of ARONE oxetane OXT221 and ARONE oxetane OXT121 (each from Toagosei Co., Ltd.).

The compounds having one or more vinyl ether groups per molecule are exemplified by 2-hydroxyethyl vinyl ether, 3-hydroxypropyl vinyl ether, 2-hydroxypropyl vinyl ether, 2-hydroxyisopropyl vinyl ether, 4-hydroxybutyl vinyl ether, 3-hydroxybutyl vinyl ether, 2-hydroxybutyl vinyl ether, 3-hydroxyisobutyl vinyl ether, 2-hydroxyisobutyl vinyl ether, 1-methyl-3-hydroxypropyl vinyl ether, 1-methyl-2-hydroxypropyl vinyl ether, 1-hydroxymethylpropyl vinyl ether, 4-hydroxycyclohexyl vinyl ether, 1,6-hexanediol mono- or di-vinyl ether, 1,4-cyclohexanedimethanol mono- or di-vinyl ether, 1,3-cyclohexanedimethanol mono- or di-vinyl ether, 1,2-cyclohexanedimethanol mono- or di-vinyl ether, p-xylene glycol mono- or di-vinyl ether, m-xylene glycol mono- or di-vinyl ether, o-xylene glycol mono- or di-vinyl ether, diethylene glycol mono- or di-vinyl ether, triethylene glycol mono- or di-vinyl ether, tetraethylene glycol mono- or di-vinyl ether, pentaethylene glycol mono- or di-vinyl ether, oligoethylene glycol mono- or di-vinyl ethers, polyethylene glycol mono- or di-vinyl ethers, dipropylene glycol mono- or di-vinyl ether, tripropylene glycol mono- or di-vinyl ether, tetrapropylene glycol mono- or di-vinyl ether, pentapropylene glycol mono- or di-vinyl ether, oligopropylene glycol mono- or di-vinyl ethers, polypropylene glycol mono- or di-vinyl ethers, and derivatives of them.

The photosensitive resin composition according to the present invention particularly preferably further includes, as the component (A), a compound having one or more oxetanyl groups per molecule in combination with the alicyclic epoxy compound(s) for a higher initial adhesive strength.

The photosensitive resin composition according to the present invention may include the component (A) in a content not critical, but preferably 20 to 99 percent by weight, and more preferably 25 to 98 percent by weight, based on the total amount (100 percent by weight) of the photosensitive resin composition. In an embodiment, the photosensitive resin composition according to the present invention further includes the component (D). The photosensitive resin composition in this embodiment may contain the component (A) in a content of typically about 20 to about 90 percent by weight, preferably 25 to 80 percent by weight, and particularly preferably 30 to 70 percent by weight, based on the total amount (100 percent by weight) of the photosensitive resin composition. The photosensitive resin composition, if including the component (A) in a content less than the range, may often offer insufficient curability and cause curing failure. In contrast, the photosensitive resin composition, if including the component (A) in a content greater than the range, may give a cured product that may readily have poor flexibility and be peeled off during a reflow process. In another embodiment, the photosensitive resin composition according to the present invention is devoid of the component (D). The photosensitive resin composition in this embodiment may contain curable compound(s) in a total content (amount) not critical, but preferably 75 to 99 percent by weight, and more preferably 80 to 98 percent by weight, based on the total amount (100 percent by weight) of the photosensitive resin composition. The photosensitive resin composition, if containing the curable compound(s) in a total content of less than 75 percent by weight, may give a cured product being insufficient in properties such as adhesiveness. In contrast, the photosensitive resin composition, if containing the curable compound(s) in a content greater than 99 percent by weight, may give a cured product that fails to exhibit sufficient light-shielding ability, because of a relatively smaller content of the component (C).

The photosensitive resin composition may contain, as the component (A), the alicyclic epoxy compound(s) in a content of typically about 20 to about 90 percent by weight, preferably 25 to 85 percent by weight, particularly preferably 30 to 80 percent by weight, and furthermore preferably 30 to 70 percent by weight, based on the total amount (100 percent by weight) of the component (A). The photosensitive resin composition, if containing the alicyclic epoxy compound(s) in a content less than the range, may readily have insufficient curability and suffer from curing failure. In contrast, the photosensitive resin composition, if containing the alicyclic epoxy compound(s) in a content greater than the range, may readily give a cured product having poor flexibility and being peeled off during a reflow process.

The photosensitive resin composition may contain, as the component (A), the other cationically polymerizable compound(s) in a content of typically about 10 to about 80 percent by weight, preferably 15 to 75 percent by weight, particularly preferably 20 to 70 percent by weight, and most preferably 30 to 70 percent by weight, based on the total amount (100 percent by weight) of the component (A). In particular, the content of the compound(s) having one or more oxetanyl groups per molecule is typically about 1 to about 80 percent by weight, preferably 3 to 75 percent by weight, particularly preferably 5 to 70 percent by weight, and most preferably 10 to 70 percent by weight, based on the total amount (100 percent by weight) of the component (A). The photosensitive resin composition, when containing the other cationically polymerizable compound(s) (particularly compound(s) having one or more oxetanyl groups per molecule) in a content within the range, can offer a higher initial curing rate to form a cured product with excellent curability. In contrast, the photosensitive resin composition, if containing the other cationically polymerizable compound(s) in an excessively high content, may readily give a cured product having a low strength and insufficient impact resistance.

(Component (B))

The photo-cationic polymerization initiator as the component (B) for use herein is a compound that generates a cationic species by photoirradiation and initiates the curing reaction of cationically polymerizable compound(s) and the like in the photosensitive resin composition, and is a photo-cationic polymerization initiator composed of a cationic moiety and an anionic moiety containing a boron atom(s) (boron element).

The cationic moiety of the photo-cationic polymerization initiator is exemplified by the cations of any known or customary photo-cationic polymerization initiators, but it is not limited to, is exemplified by a sulfonium ion, an iodonium ion, a selenium ion, an ammonium ion, a phosphonium ion, and a transition metal complex ion.

The sulfonium ion is exemplified by triarylsulfonium such as triphenylsulfonium, tri-p-tolylsulfonium, tri-o-tolylsulfonium, tris(4-methoxyphenyl)sulfonium, 1-naphthyldiphenylsulfonium, 2-naphthyldiphenylsulfonium, tris(4-fluorophenyl)sulfonium, tri-1-naphthylsulfonium, tri-2-naphthylsulfonium, tris(4-hydroxyphenyl)sulfonium, diphenyl[4-(phenylthio)phenyl]sulfonium, 4-(p-tolylthio)phenyl di-(p-phenyl)sulfonium, and [1,1'-biphenyl]-4-yl [4-(1,1'-biphenyl)-4-ylthiophenyl]phenylsulfonium; diarylsulfonium such as diphenylphenacylsulfonium, diphenyl-4-nitrophenacylsulfonium, diphenylbenzylsulfonium, and diphenylmethylsulfonium; monoarylsulfonium such as phenylmethylbenzylsulfonium, 4-hydroxyphenylmethylbenzylsulfonium, and 4-methoxyphenylmethylbenzylsulfonium; and trialkylsulfonium such as dimethyl phenacyl sulfonium, phenacyltetrahydrothiophenium, and dimethyl benzyl sulfonium.

The iodonium ion is exemplified by diphenyliodonium, di-p-tolyliodonium, bis(4-dodecylphenyl)iodonium, and bis(4-methoxyphenyl)iodonium.

The selenium ion is exemplified by triarylselenium such as triphenylselenium, tri-p-tolylselenium, tri-o-tolylselenium, tris(4-methoxyphenyl)selenium, and 1-naphthyldiphenylselenium; diarylselenium such as diphenylphenacylselenium, diphenylbenzylselenium, and diphenylmethylselenium; monoarylselenium such as phenylmethylbenzylselenium; and trialkylselenium such as dimethylphenacylselenium.

The ammonium ion is exemplified by tetraalkylammonium such as tetramethylammonium, ethyltrimethylammonium, diethyldimethylammonium, triethylmethylammonium, tetraethylammonium, trimethyl-n-propylammonium, and trimethyl-n-butylammonium; pyrrolidium such as N,N-dimethylpyrrolidium and N-ethyl-N-methylpyrrolidium; imidazolinium such as N,N'-dimethylimidazolinium and N,N'-diethylimidazolinium; tetrahydropyrimidium such as N,N'-dimethyltetrahydropyrimidium and N,N'-diethyltetrahydropyrimidium; morpholinium such as N,N-dimethylmorpholinium and N,N-diethylmorpholinium; piperidinium such as N,N-dimethylpiperidinium and N,N-diethylpiperidinium; pyridinium such as N-methylpyridinium and N-ethylpyridinium; imidazolium such as N,N'-dimethylimidazolium; quinolium such as N-methylquinolium; isoquinolium such as N-methylisoqunolium; thiazonium such as benzylbenzothiazonium; and acridium such as benzylacridium.

The phosphonium ion is exemplified by tetraaryl phosphonium such as tetraphenylphosphonium, tetra-p-tolylphosphonium, and tetrakis(2-methoxyphenyl)phosphonium; triarylphosphonium such as triphenylbenzylphosphonium; and tetraalkylphosphonium such as triethylbenzylphosphonium, tributylbenzylphosphonium, tetraethylphosphonium, tetrabutylphosphonium, and triethylphenacylphosphonium.

The transition metal complex ion is exemplified by chromium complex cations such as ($\eta$5-cyclopentadienyl)($\eta$6-toluene)Cr$^+$ and ($\eta$5-cyclopentadienyl)($\eta$6-xylene)Cr$^+$; and iron complex cations such as ($\eta$5-cyclopentadienyl)($\eta$6-toluene)Fe$^+$ and ($\eta$5-cyclopentadienyl) ($\eta$6-xylene)Fe$^+$.

The anionic moiety of the photo-cationic polymerization initiator as the component (B) may be any boron atom-containing anion, but it is not limited to, is exemplified by $BF_4^-$ and anions represented by Formula (1):

[Chem. 15]

$$[(R)_n BF_{4-n}]^- \quad (1)$$

In Formula (1), R represents a monovalent hydrocarbon group or a monovalent fluorinated hydrocarbon group. The monovalent hydrocarbon group is exemplified by aliphatic hydrocarbon groups [e.g., alkyl groups, alkenyl groups, and alkynyl groups]; alicyclic hydrocarbon groups [e.g., cycloalkyl groups, cycloalkenyl groups, and bridged cyclic hydrocarbon groups]; aromatic hydrocarbon groups [e.g., aryl groups such as a phenyl group and a naphthyl group]; and monovalent hydrocarbon groups [e.g., cycloalkyl-alkyl groups, aralkyl groups, and alkyl-substituted aryl groups (such as tolyl group)] each including two or more of an aliphatic hydrocarbon group, an alicyclic hydrocarbon group, and an aromatic hydrocarbon group linked to each other. The monovalent fluorinated hydrocarbon group is exemplified by groups obtained by partially or wholly substituting the hydrogen atoms in the above-mentioned monovalent hydrocarbon groups with fluorine atoms, and is specifically exemplified by fluorinated alkyl groups, fluorinated aryl groups, and fluorinated alkyl group-substituted aryl groups. When n is an integer of 2 or more, two or more Rs may be identical or different.

In Formula (1), n represents an integer from 1 to 4. Among them, n is preferably an integer from 2 to 4, and more preferably 3 or 4.

The anionic moiety is more specifically exemplified by $BF_4^-$, $[B(C_6H_5)_4]^-$, $[(C_6H_5)B(C_6F_5)_3]^-$, and $[(C_6H_5)B(C_6H_3(CF_3)_2)_3]^-$ [=phenyl tris(trifluoromethyl)phenyl borate].

Among them, the anionic moiety is preferably an anion including one or more fluorine atoms together with a boron atom [specifically, e.g., the above-mentioned $BF_4^-$, and a compound represented by Formula (1) wherein at least one R (preferably 2 to 4 Rs, and more preferably 3 or 4 Rs) is a monovalent fluorinated hydrocarbon group], and more preferably an anion represented by Formula (2):

[Chem. 16]

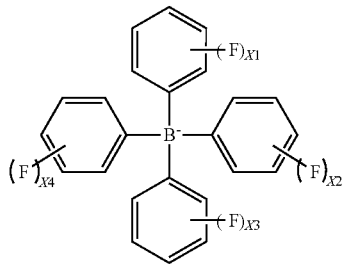

(2)

wherein X1 to X4 (X1, X2, X3, and X4) are identical or different, each represent an integer from 0 to 5, and the total of all of them (X1 to X4) is 1 or more.

The anionic moiety is particularly preferably an anion represented by Formula (2), and more preferably $[B(C_6F_5)_4]^-$ [=tetrakis(pentafluorophenyl) borate].

The photo-cationic polymerization initiator as the component (B) preferably usable is specifically exemplified by diphenyl[4-(phenylthiophenyl)]sulfonium tetrakis(pentafluorophenyl) borate, and [1,1'-biphenyl]-4-yl [4-(1,1'-biphenyl)-4-ylthiophenyl]phenylsulfonium tetrakis(pentafluorophenyl) borate.

Each of the photo-cationic polymerization initiators as the component (B) may be used alone or in combination.

The photosensitive resin composition may include the component (B) in a content of typically about 0.1 to about 30 parts by weight, preferably 0.3 part by weight or more, more preferably 0.5 to 25 parts by weight, furthermore preferably 1 to 20 parts by weight, particularly preferably 1.5 to 15 parts by weight, and most preferably 1.5 to 10 parts by weight, per 100 parts by weight of the component (A). The photosensitive resin composition, if including the component (B) in a content less than the range, may readily offer insufficient curability. In contrast, the photosensitive resin composition, if including the component (B) in a content greater than the range, may readily offer insufficient storage stability.

The photosensitive resin composition according to the present invention may further include a sensitizer (photosensitizer) to be used for increasing the sensitivity of general photo-cationic polymerization initiators. The sensitizer for use herein may be any known or customary sensitizer, but it is not limited to, is exemplified by amine compounds (such as triethanolamine, methyldiethanolamine, triethylamine, and diethylamine); thioxanthone and derivatives thereof (such as 2-chlorothioxanthone); anthraquinone and derivatives thereof; anthracene and derivatives thereof; perylene and derivatives thereof; pyrene and derivatives thereof; acridine and derivatives thereof (such as acridine orange); benzophenone; benzoin isopropyl ether; and benzoflavin. Each of the sensitizers may be used alone or in combination. The photosensitive resin composition according to the present invention may include the sensitizer in a content (amount) not critical, but preferably 10 parts by weight or less, and more preferably 3 parts by weight or less, per 100 parts by weight of the total amount of the component (A) included in the photosensitive resin composition.

(Component (C))

The component (C) for use herein is a light-shielding material that disperses in the photosensitive resin composition and the cured product thereof and imparts light-shielding ability to them. Typically, any of pigments and dyes is advantageously used herein as the component (C).

The pigments are exemplified by inorganic pigments, organic pigments, and pigments each including an inorganic pigment (e.g., a carbon black or black titanium oxide) having a surface coated with an organic material (e.g., a resin). The inorganic pigments are exemplified by black inorganic pigments such as carbon blacks, chromium oxide, iron oxide, black titanium oxide, acetylene black, lamp black, bone black, black lead (graphite), black synthetic oxide, black pigments containing copper and chromium, black pigments containing copper, iron, and manganese, black pigments containing cobalt, iron, and chromium, ruthenium oxide, graphite, metal microparticles, metal oxide microparticles, multi-component oxide microparticles, metal sulfide microparticles, and metal nitride microparticles. The organic pigments are exemplified by black organic pigments such as perylene black, cyanine black, and aniline black; and black-simulating mixed color organic pigments obtained by mixing two or more pigments typically of red, blue, green, purple, yellow, cyan, or magenta, such as azo, phthalocyanine, quinacridone, benzimidazolone, isoindolinone, dioxazine, indanthrene, and perylene pigments. Each of them may be used alone or in combination.

The dyes are exemplified by azo, anthraquinone, phthalocyanine, quinonimine, quinoline, nitro, carbonyl, and methine dyes. Each of them may be used alone or in combination.

Among them, as the component (C), pigments are preferred, and carbon blacks are particularly preferred as the light-shielding material for use herein, for excellent dispersibility, light-shielding ability, and durability.

The light-shielding material has an average particle diameter of typically preferably about 5 to about 500 nm as determined by a dynamic light scattering measurement. The light-shielding material, if having an average particle diameter greater than the range, may readily offer insufficient light-shielding ability. In contrast, the light-shielding material, if having an average particle diameter less than the range, may become liable to aggregate and to fail to satisfactorily disperse.

The photosensitive resin composition may include the component (C) in an amount of typically about 0.5 to about 50 parts by weight, preferably 1 to 30 parts by weight, and particularly preferably 3 to 20 parts by weight, per 100 parts by weight of the total amount of the curable components (when the component (D) is included, the total amount of the component (A) and the component (D)). The photosensitive resin composition according to the present invention may include the component (C) in a content (amount) not critical, but preferably 0.5 to 20 percent by weight, more preferably 1.0 to 15 percent by weight, and furthermore preferably 1.5 to 10 percent by weight, based on the total amount (100 percent by weight) of the photosensitive resin composition. The photosensitive resin composition, if including the component (C) in a content less than the range, may often fail to enjoy sufficient light-shielding ability. In contrast, the photosensitive resin composition, if including the component (C) in a content greater than the range, may readily have a higher viscosity and inferior workability.

(Component (D))

The photosensitive resin composition according to the present invention may further include a component as follows. The photosensitive composition according to the present invention, when further including the component (D), acquires a function of being cured more readily and a function of achieving better adhesiveness typically to glass, imparts flexibility to the resulting cured product, and thereby helps the cured product to conform satisfactorily to an adherend surface shape and to have better adhesiveness to the adherend.

(D) a hydroxyl-containing compound having a molecular weight of 500 or more.

The component (D) contains hydroxyl groups in a number not critical, but preferably two or more, and particularly preferably two per one molecule.

The component (D) has a molecular weight of 500 or more, preferably 500 to 100000, particularly preferably 1000 to 80000, and most preferably 1500 to 50000. The component (D), if having a molecular weight less than the range, may often less effectively impart flexibility to the cured product. In contrast, the component (D), if having a molecular weight greater than the range, may readily cause the composition to have a higher viscosity and to offer inferior workability. The component (D) has a number-average molecular weight of preferably 500 or more, more preferably 500 to 100000, particularly preferably 1000 to 80000, and most preferably 1500 to 50000. The component (D), if having a number-average molecular weight less than the range, may often less effectively impart flexibility to the cured product. In contrast, the component (D), if having a number-average molecular weight greater than the range, may readily cause the composition to have a higher viscosity and to offer inferior workability.

The hydroxyl-containing compound having a molecular weight of 500 or more as the component (D) is exemplified by hydroxyl-containing compounds having a polycarbonate skeleton in the molecule; hydroxyl-containing compounds having a polyester skeleton in the molecule; and hydroxyl-containing compounds having a polydiene skeleton in the molecule. Each of them may be used alone or in combination.

Each of such hydroxyl-containing compounds having a polycarbonate skeleton in the molecule may be synthesized typically by a phosgene method; or transesterification between a polyol and a dialkyl carbonate or diphenyl carbonate, where the dialkyl carbonate is exemplified by dimethyl carbonate or diethyl carbonate (see JP-A No. S62-187725, JP-A No. H02-175721, JP-A No. H02-49025, JP-A No. H03-220233, and JP-A No. H03-252420).

The polyol for use in the transesterification is exemplified by 1,6-hexanediol, ethylene glycol, diethylene glycol, 1,3-propanediol, 1,4-butanediol, 1,3-butanediol, 2,3-butanediol, 1,5-pentanediol, 3-methyl-1,5-pentanediol, 1,4-cyclohexanedimethanol, 1,12-dodecanediol, polybutadienediols, neopentyl glycol, tetramethylene glycol, propylene glycol, dipropylene glycol, glycerol, trimethylolpropane, 1,3-dihydroxyacetone, hexylene glycol, 1,2,6-hexanetriol, ditrimethylolpropane, trimethylolethane, trimethyloloctane, and pentaerythritol. The polyol for use herein is also exemplified by "Glycol esters" (available from MITSUBISHI GAS CHEMICAL COMPANY, INC.), polyester polyols, and polyether polyols.

The hydroxyl-containing compounds having a polycarbonate skeleton in the molecule are available as commercial products typically under the trade names of PLACCEL CD205, PLACCEL CD205PL, PLACCEL CD205HL, PLACCEL D210, PLACCEL CD210PL, PLACCEL CD210HL, PLACCEL CD220, PLACCEL CD220PL, PLACCEL CD220HL, PLACCEL CD220EC, and PLACCEL CD221T (each from Daicel Corporation); and the trade names of UM-CARB90 (1/3), UM-CARB90 (1/1), and UC-CARB100 (each from Ube Industries, Ltd.).

Each of the hydroxyl-containing compounds having a polyester skeleton in the molecule can be synthesized by reacting a polyol with a carboxylic acid (e.g., a polycarboxylic acid or hydroxycarboxylic acid). Alternatively, each of the compounds can also be synthesized by ring-opening polymerization of a lactone.

The polyol acting as a raw material for the hydroxyl-containing compounds having a polyester skeleton in the molecule is exemplified as with the polyol for use in the transesterification.

The carboxylic acid acting as a raw material for the hydroxyl-containing compounds having a polyester skeleton in the molecule is exemplified by oxalic acid, adipic acid, sebacic acid, fumaric acid, malonic acid, succinic acid, glutaric acid, azelaic acid, citric acid, 2,6-naphthalenedicarboxylic acid, phthalic acid, isophthalic acid, terephthalic acid, citraconic acid, 1,10-decanedicarboxylic acid, methylhexahydrophthalic anhydride, hexahydrophthalic anhydride, methyltetrahydrophthalic anhydride, tetrahydrophthalic anhydride, pyromellitic anhydride, trimellitic anhydride, lactic acid, malic acid, glycolic acid, dimethylolpropionic acid, and dimethylolbutanoic acid.

The lactone is exemplified by $\epsilon$-caprolactone, $\delta$-valerolactone, and $\gamma$-butyrolactone.

The hydroxyl-containing compounds having a polyester skeleton in the molecule are available as commercial products typically under the trade names of PLACCEL 205U, PLACCEL L205AL, PLACCEL L208AL, PLACCEL L212AL, PLACCEL L220AL, PLACCEL L230AL, PLACCEL 220ED, PLACCEL 220EC, PLACCEL 220EB, PLACCEL 303, PLACCEL 305, PLACCEL 308, PLACCEL 312, PLACCEL L312AL, PLACCEL 320, PLACCEL L320AL, PLACCEL 320ML, PLACCEL 410, PLACCEL 410D, PLACCEL P3403, PLACCEL E227, PLACCEL DC2009, PLACCEL DC2016, and PLACCEL DC2209 (each from Daicel Corporation); and Kuraray Polyol P-510 (from Kuraray Co. Ltd.).

Of the hydroxyl-containing compounds having a polyester skeleton in the molecule, preferred to be used are hydroxyl-containing compounds obtained by ring-opening polymerization of a lactone, of which hydroxyl-containing compounds having a skeleton formed by the ring-opening polymerization of caprolactone are more preferred. These compounds are preferred for imparting flexibility to the cured product.

The hydroxyl-containing compounds having a polydiene skeleton in the molecule are exemplified by compounds having a molecular chain with a polybutadiene skeleton or polyisoprene skeleton, and hydroxyl groups at both terminals of the molecule chain; and compounds corresponding to the compounds having a molecular chain with a polybutadiene skeleton or polyisoprene skeleton, and hydroxyl groups at both terminals of the molecular chain, except with part of double bonds of the molecular chain being epoxidized.

The hydroxyl-containing compounds having a polydiene skeleton in the molecule are available as commercial products typically under the trade names of EPOLEAD PB3600 (from Daicel Corporation) and Poly ip (from Idemitsu Kosan Co., Ltd.).

Among them, the component (D) for use herein preferably includes both a hydroxyl-containing compound having a polycarbonate skeleton in the molecule and a hydroxyl-containing compound having a polydiene skeleton in the molecule in combination. This is preferred for imparting flexibility and toughness to the cured product.

The photosensitive resin composition according to the present invention may include the component (D) in an amount of typically about 5 to about 80 percent by weight, preferably 10 to 70 percent by weight, and particularly preferably 15 to 60 percent by weight, based on the total amount (100 percent by weight) of curable components contained in the composition (i.e., when the component (D) is included, the total amount of the components (A) and (D)). The photosensitive resin composition, if including the component (D) in an amount less than the range, may often give a cured product that has insufficient flexibility, thereby has insufficient adhesion to the adherend surface, and is liable to be peeled off upon a reflow process. In contact, the photosensitive resin composition, if including the component (D) in an amount greater than the range, may readily give a cured product that is inferior in impact resistance, transparency, heat resistance, and moisture resistance.

The ratio (in weight ratio) of the hydroxyl-containing compound having a polycarbonate skeleton in the molecule to the hydroxyl-containing compound having a polydiene skeleton in the molecule, when used in combination as the component (D), is typically about 1:99 to about 99:1.

[Thermal Initiator]

The photosensitive resin composition according to the present invention may further include a thermal initiator (thermal polymerization initiator) as a polymerization initiator in addition to the component (B). The thermal initiator for use herein may be any of known or customary thermal initiators. Such thermal initiators are compounds that can initiate a polymerization reaction of a cationically polymerizable compound by heating. The thermal initiator is exemplified by thermal cationic polymerization initiators that generate a cationic species by heating and thereby initiate polymerization. Each of different thermal initiators may be used alone or in combination.

The thermal cationic polymerization initiators are exemplified by aryldiazonium salts, aryliodonium salts, arylsulfonium salts, and allene-ion complexes. The thermal cationic polymerization initiators usable herein are also exemplified by compounds of a silanol (e.g., triphenylsilanol) with a chelate compound between a metal (e.g., aluminum or titanium) and one of acetoacetic acid and a diketone; and compounds of a phenol (e.g., bisphenol-S) with a chelate compound between a metal (e.g., aluminum or titanium) and one of acetoacetic acid and a diketone. The thermal cationic polymerization initiators usable herein are further exemplified by commercial products available typically under the trade names of PP-33, CP-66, and CP-77 (each from ADEKA CORPORATION); the trade name of FC-509 (from 3M Company); the trade name of UVE1014 (General Electric Company); the trade names of San-Aid SI-60L, San-Aid SI-80L, San-Aid SI-100L, San-Aid SI-110L, and San-Aid SI-150L (each from SANSHIN CHEMICAL INDUSTRY CO., LTD.); and the trade name of CG-24-61 (Ciba Japan K.K.).

The use of the thermal initiator (in combination with the component (B)) enables a curing reaction to further proceed by a heat treatment (annealing) and is effective typically when it is difficult to proceed the curing reaction sufficiently by photoirradiation alone. The use is particularly effective upon the formation of a relatively thick cured product, namely, in the case where it is difficult to irradiate the entire photosensitive resin composition with light efficiently. Preferred conditions for the heat treatment will be described later.

The photosensitive resin composition according to the present invention may include the thermal initiator in a content (amount) not critical, but preferably 0.001 to 10 parts by weight, more preferably 0.01 to 5 parts by weight, and furthermore preferably 0.1 to 3 parts by weight, per 100 parts by weight of the total amount of the component (A) in the photosensitive resin composition. The photosensitive resin composition, when including the thermal initiator in a content less than 0.001 part by weight, may readily cause curing failure particularly upon the formation of a relatively thick cured product. In contrast, the photosensitive resin composition, if including the thermal initiator in a content greater than 10 parts by weight, may cause the cured product to have inferior properties such as heat resistance or may be disadvantageous in cost. The total amount of two or more thermal initiators upon combination use is preferably controlled within the range.

[Antioxidant]

The photosensitive resin composition according to the present invention may further include one or more antioxidants in addition to the above-mentioned components. The antioxidants for use herein may be any of known or customary antioxidants not limited, but are exemplified by phenolic, phosphorus, and sulfur antioxidants. Each of different antioxidants may be used alone or in combination.

The phenolic antioxidants are exemplified by monophenols such as 2,6-di-t-butyl-p-cresol, butylated hydroxyanisoles, 2,6-di-t-butyl-p-ethylphenol, and stearyl β-(3,5-di-t-butyl-4-hydroxyphenyl)propionate; bisphenols such as 2,2'-methylenebis(4-methyl-6-t-butylphenol), 2,2'-methylenebis(4-ethyl-6-t-butylphenol), 4,4'-thiobis(3-methyl-6-t-butylphenol), 4,4'-butylidenebis(3-methyl-6-t-butylphenol), and 3,9-bis[1,1-dimethyl-2-{β-(3-t-butyl-4-hydroxy-5-methylphenyl)propionyloxy}ethyl]-2,4,8,10-tetraoxaspiro[5.5]undecane; and high-molecular-weight phenols such as 1,1,3-tris(2-methyl-4-hydroxy-5-t-butylphenyl)butane, 1,3,5-trimethyl-2,4,6-tris(3,5-di-t-butyl-4-hydroxybenzyl)benzene, tetrakis-[methylene-3-(3',5'-di-t-butyl-4'-hydroxyphenyl) propionate]methane, bis[3,3'-bis-(4'-hydroxy-3'-t-butylphenyl)butyric acid] glycol ester, 1,3,5-tris(3',5'-di-t-butyl-4'-hydroxybenzyl)-s-triazine-2,4,6-(1H,3H,5H)trione, and tocophenols.

The phosphorus antioxidants are exemplified by phosphites such as triphenyl phosphite, diphenyl isodecyl phosphite, phenyl diisodecyl phosphite, tris(nonylphenyl) phosphite, diisodecyl pentaerythritol phosphite, tris(2,4-di-t-butylphenyl) phosphite, cyclic neopentanetetrayl bis(octadecyl) phosphite, cyclic neopentanetetrayl bis(2,4-di-t-butylphenyl) phosphite, cyclic neopentanetetrayl bis(2,4-di-t-butyl-4-methylphenyl) phosphite, and bis[2-t-butyl-6-methyl-4-{2-(octadecyloxycarbonyl)ethyl}phenyl] hydrogenphosphite; and oxaphosphaphenanthrene oxides such as 9,10-dihydro-9-oxa-10-phosphaphenanthrene-10-oxide and 10-(3,5-di-t-butyl-4-hydroxybenzyl)-9,10-dihydro-9-oxa-10-phosphaphenanthrene-10-oxide.

The sulfur antioxidants are exemplified by dilauryl 3,3'-thiodipropionate, dimyristyl 3,3'-thiodipropionate, and distearyl 3,3'-thiodipropionate.

The photosensitive resin composition according to the present invention may include the antioxidant in a content (amount) not critical, but preferably 0.001 to 15 parts by weight, more preferably 0.01 to 10 parts by weight, and furthermore preferably 0.1 to 5 parts by weight, per 100 parts by weight of the total amount of the component (A) in the photosensitive resin composition. The photosensitive resin composition, if including the antioxidant in a content less than 0.001 part by weight, may undergo insufficient suppression of deteriorations such as oxidation in some applications. In contrast, the photosensitive resin composition, if including the antioxidant in a content greater than 15 parts by weight, may cause the cured product to have inferior properties such as heat resistance or cause a disadvantage in cost. The total amount of two or more antioxidants upon combination use is preferably controlled within the range.

In addition to the aforementioned components, the photosensitive resin composition according to the present invention may further include any of additional components within ranges not adversely affecting advantageous effects of the present invention. The additional components are exemplified by hydroxyl-containing compounds having a molecular weight less than 500 (e.g., diethylene glycol), antifoaming agents, leveling agents, coupling agents (e.g., silane coupling agents), surfactants, inorganic fillers, flame retardants, ultraviolet absorbers, ion adsorbents, phosphors, mold-release agents, pigment-dispersing agents, dispersing aids, and other customary additives.

The photosensitive resin composition may include one or more of such additional components in a content of about 10 percent by weight or less based on the total amount (100 percent by weight) of the photosensitive resin composition. The "content" refers to a total content upon combination use of two or more additional components.

The photosensitive resin composition according to the present invention may be prepared typically by mixing and stirring the components (A), (B), and (C), and optionally with one or more other components in predetermined proportions; and debubbling (degassing) the mixture in vacuo according to necessity. For better dispersibility of the component (C) (particularly, a pigment), the material components may be subjected to a dispersion treatment by a known process such as a dispersing process using a ball mill, sand mill, bead mill, three-roll mill, paint shaker, ultrasonic application, or air bubble homogenizer.

The photosensitive resin composition according to the present invention may have a viscosity at 25° C. of not critical, but preferably 100 to 100000 mPa·s, more preferably 500 to 10000 mPa·s, and furthermore preferably 1000 to 8000 mPa·s. The photosensitive resin composition, if having a viscosity out of the range, may be difficult to handle and give a cured product (e.g., a light-shielding film) with insufficient productivity. The viscosity at 25° C. may be measured typically with a rheometer (trade name Physica UDS-200, Anton Paar GmbH) and a cone-plate (with a cone diameter of 16 mm and a taper angle of 0 degree) at a temperature of 25° C. and a number of revolutions of 20 rpm.

(Cured Product)

The photosensitive resin composition according to the present invention can form a cured product upon photoirradiation to allow the cationic polymerization reaction of the component (A) in the photosensitive resin composition to proceed. When the photosensitive resin composition further includes the component (D), the photoirradiation further allows the reaction between the component (A) and the component (D) to proceed. Light (active energy ray) for use herein to allow the polymerization reaction to proceed is not limited and can be any of, for example, infrared rays, visible light, ultraviolet rays, X-rays, electron beams, alpha rays, beta rays, and gamma rays. Among them, ultraviolet rays are preferred for excellent handleability.

Photoirradiation conditions to form the cured product are not critical and can be appropriately adjusted according typically to the type and energy of light to be applied, and the shape and size of the cured product to be formed. Typically, the irradiation with an ultraviolet ray may be performed at an irradiation intensity of typically preferably about 0.1 to about 1000 mW/cm$^2$, and more preferably 1 to 500 mW/cm$^2$ for an irradiation time of typically about 1 to about 120 seconds, and preferably 3 to 60 seconds. The photoirradiation may employ, for example, any of high-pressure mercury lamps, ultra-high-pressure mercury lamps, xenon lamps, carbon arc, metal halide lamps, sunlight, LED lamps, and laser.

The photosensitive resin composition according to the present invention has the configuration and can thereby be rapidly cured with excellent curability at a very high curing rate by photoirradiation even when including the component (C) in such an amount as to impart sufficient light-shielding ability thereto. The photosensitive resin composition can form a cured product excellent in light-shielding ability and adhesiveness. The photosensitive resin composition provides a high initial adhesive strength and offers an adhesive strength (to a glass plate) of typically 1 MPa or more, and preferably 5 MPa or more upon irradiation with an ultraviolet ray at 200 mW/cm$^2$ for 15 seconds.

The curing reaction of the photosensitive resin composition according to the present invention can be further accelerated by a heat treatment (annealing). The heat treatment can be performed at any time such as after the photoirradiation or simultaneously with the photoirradiation. The heat treatment conditions are not critical and appropriately adjustable according typically to the shape and size of the cured product to be formed. In a preferred embodiment, the heat treatment may be performed at a heating temperature of preferably 40° C. to 250° C., and more preferably 60° C. to 200° C., for a heating time of preferably 1 to 480 minutes, and more preferably 3 to 120 minutes. The heating temperature in the heat treatment may be constant or be varied continuously or stepwise.

The cured product of the photosensitive resin composition according to the present invention has high light-shielding ability. The cured product, typically when formed to a thickness of 20 μm, has a light-shielding rate of typically preferably 85% or more, more preferably 90% or more, particularly preferably 95% or more, and most preferably 96% or more. The light-shielding rate may be measured by preparing a 20-μm thick cured product as a test specimen; measuring the total luminous transmittance of the test specimen according to Japanese Industrial Standard (JIS) K7105 (1981), except for using a $D_{65}$ illuminant as a light source; and calculating the light-shielding rate according to the expression:

Light-shielding rate[%]=100[%]−(Total luminous transmittance[%])

The cured product, typically when formed to a thickness of 10 μm, has a total luminous transmittance of preferably 1.5% or less (e.g., 0% to 1.5%), more preferably 1.0% or less, and furthermore preferably 0.5% or less. The total luminous transmittance may be measured typically by forming a 10-μm thick layer of cured product (light-shielding film) on a glass plate to give a test specimen; and measuring the total luminous transmittance of the test specimen according to JIS K7105 (1981), except for using the $D_{65}$ illuminant as a light source.

The cured product may have a glass transition temperature (Tg) not critical, but preferably 70° C. or higher (e.g., 70° C. to 250° C.), more preferably 80° C. or higher, furthermore preferably 90° C. or higher, and particularly preferably higher than 100° C. The cured product may have a glass transition temperature of 130° C. or higher in some applications. The cured product, if having a glass transition temperature lower than 70° C., may offer insufficient durability (heat resistance) in some applications. The glass transition temperature of the cured product may be measured typically as a tan δ (loss tangent) peak top temperature in a dynamic viscoelastic measurement (dynamic mechanical analysis; DMA) according to JIS K7244-1 to -7. The measurement may be performed typically at a rate of temperature rise of 5° C./min. The glass transition temperature of the cured product may be controlled typically by compositions of curable component(s) (the component (A), optionally in combination with the component (D)).

The cured product may have a storage elastic modulus at 25° C. not critical, but preferably 0.1 to 10 GPa, more preferably 1 to 5 GPa, and particularly preferably greater than (higher than) 1.5 GPa. The cured product, if having a storage elastic modulus at 25° C. of less than 0.1 GPa, may offer insufficient durability in some applications. In contrast, the cured product, if having a storage elastic modulus at 25° C. of greater than 10 GPa, may offer insufficient flexibility in some applications. The storage elastic modulus of the cured product may be measured typically by a dynamic mechanical analysis (DMA) according to JIS K7244-1 to -7. The measurement may be performed typically at a rate of temperature rise of 5° C./min. The storage elastic modulus of the cured product may be controlled typically by the composition of curable components (the component (A), optionally in combination with the component (D)).

For example, the photosensitive resin composition according to the present invention can be cured rapidly to form a light-shielding film or light-shielding layer upon application to a predetermined position of an optical component and subsequent photoirradiation. The photosensitive resin composition can be applied by a known or customary technique such as dispensing or transfer printing (gravure printing). The light-shielding film or light-shielding layer may have any shape appropriately choosable.

In addition to the formation of the light-shielding film or light-shielding layer, the photosensitive resin composition according to the present invention is also usable in other applications such as printing inks, ink-jet inks, materials for photomask production, materials for proof printing production, etching resists, solder resists (solder masks), plasma display panel barrier ribs, dielectric patterns, electrode (conductor circuit) patterns, electronic component circuit patterns, electroconductive pastes, electroconductive films, and lamination of a camera cabinet with a substrate (e.g., an interposer).

The photosensitive resin composition according to the present invention can form a cured product rapidly, inexpensively, and easily by photoirradiation, where the cured product has high light-shielding ability. Assume that the photosensitive resin composition according to the present invention is used as an adhesive, applied to between lenses constituting an imaging unit of an electronic appliance, and irradiated with light. The photosensitive resin composition in this case can rapidly bond and fix the lenses with each other and simultaneously form a light-shielding layer between the lenses. Alternatively, it is also acceptable that the photosensitive resin composition according to the present invention is used to form a light-shielding film, and the resulting light-shielding film is applied between lenses with an adhesive, where the lenses constitute an imaging unit. In addition, the cured product (e.g., light-shielding film or light-shielding layer) obtained by curing the photosensitive resin composition according to the present invention, particularly when further including the component (D), has reflow heat resistance and can be mounted typically onto a circuit board by solder reflow. This contributes to shorter working processes, and dramatically better productivity. This contributes to further thinning of the imaging unit.

(Optical Component)

An optical component according to an embodiment of the present invention includes a cured product formed from the photosensitive resin composition according to the present invention. The optical component can exhibit excellent quality, because the cured product, formed typically as a light-shielding film or light-shielding layer, has high light-shielding ability.

The cured product (e.g., light-shielding film or light-shielding layer) in the optical component may have a thickness of typically about 50 μm or less, while the thickness can be appropriately selected according typically to the type, size, shape, and other factors of the optical component. The cured product according to the present invention is formed from the photosensitive resin composition. The cured product, even when having a relatively large thickness, resists the occurrence of disadvantages caused by curing failure of the photosensitive resin composition. The disadvantages are exemplified by adhesive strength reduction, heat resistance deterioration, and surface tack occurrence. The "relatively large thickness" refers to a thickness of typically larger than 100 μm, more specifically 300 μm or more, and particularly 500 μm or more.

The optical component is exemplified by known or customary optical components including lenses; solid-state image sensing devices such as CCD image sensors and CMOS image sensors; touch-screen panels; liquid crystal displays; plasma display panels; LED packages; and various electronic components. Such optical components may be typically applied to the fields of portable electronic appliances such as cellular phones and smartphones. Assume that the cured product according to the present invention is included in the optical component as a light-shielding film or light-shielding layer. The light-shielding film or light-shielding layer in this case may be present typically as at least one light-shielding region selected from a region between lenses (a region other than the lenses) or a part of a lens; a region in a black matrix between and around color patterns in color filters; and a region in an LED package.

EXAMPLES

The present invention will be illustrated in further detail with reference to several examples below. It should be noted, however, that the examples are by no means intended to limit the scope of the invention.

Examples 1 to 4 and Comparative Examples 1 and 2

Components were combined according to formulations (in part by weight) given in Table 1, stirred and mixed in a planetary centrifugal mixer, and yielded homogeneous photosensitive resin compositions. The components included curable components, a photo-cationic polymerization initiator, and a light-shielding material. The resulting photosensitive resin compositions were subjected to measurements and evaluations by methods as follows. The results of measurements and evaluations are indicated in Table 1.

(1-1) Light-shielding Ability Evaluation

Each of the above-obtained photosensitive resin compositions was applied onto a piece of glass to a thickness of 20 μm using an applicator. Next, the applied photosensitive resin compositions were irradiated with an ultraviolet ray using an ultraviolet irradiator (UV or UV-LED irradiator) and yielded cured products (cured resins). The irradiation was performed at an irradiation intensity of 200 mW/cm², an integrated irradiance (integrated light quantity) of 3000 mJ/cm², and an irradiation time of 15 seconds.

The above-obtained laminates of the glass and the cured product, as light-shielding ability evaluation samples, were subjected to a total luminous transmittance measurement, based on which a light-shielding rate was determined according to the expression, and the light-shielding ability was evaluated:

Light-shielding rate[%]=100[%]−(Total luminous transmittance[%])

The total luminous transmittance was measured with a turbidimeter (trade name NDH2000, Nippon Denshoku Industries Co., Ltd.).

(1-2) Initial Adhesiveness Evaluation

First, a 10-μm thick printed glass plate (R-line slide glass, Product No. RCS-01; hereinafter, simply referred to as "glass plate," Matsunami Glass Ind., Ltd.) was disposed so as for the printed portion to be the upper surface, and 2 mg of each of the above-obtained photosensitive resin compositions was applied to an area 1-cm apart from the side with printed dots. Next, another sheet of glass plate was superposed on the aforementioned glass plate in such a way that the printed portion of the aforementioned glass plate was brought into contact with the coating liquid (the applied photosensitive resin composition) and the superposition width of the two sheets of glass plate was about 2 cm; then the superposed portions were fixed with a clip. In this case, the photosensitive resin composition was spread between the two sheets of glass plate as a wet area of about 1 mm in diameter and 18 to 22 μm in thickness. Subsequently, the photosensitive resin compositions were irradiated with an ultraviolet ray using an ultraviolet irradiator (UV or UV-LED irradiator), and thus the photosensitive resin compositions were cured to yield adhesiveness evaluation samples. The irradiation was performed at an irradiation intensity of 200 mW/cm², an integrated irradiance (integrated light quantity) of 3000 mJ/cm², and an ultraviolet ray irradiation time of 15 seconds.

On each of the adhesiveness evaluation samples, a bond strength (initial adhesive strength) (MPa) of the cured product (thickness: 18 to 22 μm) of the photosensitive resin composition with respect to the glass plates in a shearing direction was measured with the TENSILON RTF-1350 (A&D Co., Ltd.), and thus the initial adhesiveness was evaluated.

When a sample offered a high initial adhesive strength and underwent glass plate rupture upon the measurement, the initial adhesive strength thereof is indicated as ">15" (namely, a value greater than 15 MPa) in Table 1. In contrast, when the photosensitive resin composition was not cured even with irradiation of an ultraviolet ray under the above-mentioned conditions, and the measurement of the initial adhesive strength was unsuccessful, the initial adhesive strength thereof is indicated as "not cured" in Table 1.

TABLE 1

| | | | Example 1 | Example 2 | Example 3 | Example 4 | Com. Ex. 1 | Com. Ex. 2 |
|---|---|---|---|---|---|---|---|---|
| Photosensitive resin composition | Curable components (curable compounds) | EHPE3150 | 20 | 20 | — | — | 20 | — |
| | | 3,4,3',4'-Diepoxybicyclohexyl | 45 | 45 | 45 | 45 | 45 | 45 |
| | | OXT221 | 15 | 15 | 15 | 15 | 15 | 15 |
| | | CD220PL | 20 | 20 | 20 | 20 | 20 | 20 |
| | | PB3600 | — | — | 20 | 20 | — | 20 |
| | Photo-cationic polymerization initiator | b-1 | 2.5 | — | 2.5 | — | — | — |
| | | b-2 | — | 2.5 | — | 2.5 | — | — |
| | | b-3 | — | — | — | — | 5 | 5 |
| | Light-shielding material | Carbon black | 5 | 5 | 10 | 10 | 5 | 10 |
| Curing conditions | UV irradiation time (sec) | | 15 | 15 | 15 | 15 | 15 | 15 |
| Cured product | Thickness (mm) | | 20 | 20 | 20 | 20 | 20 | 20 |
| | Light-shielding rate (%) | | 95.2 | 95.8 | 99.6 | 99.7 | 95.8 | 99.6 |
| | Initial adhesive strength (MPa) | | >15 | >15 | >15 | >15 | Not cured | Not cured |

As is seen from above, the photosensitive resin compositions obtained in Examples 1 to 4 met the conditions specified in the present invention. These photosensitive resin compositions exhibited excellent curability (were cured rapidly) upon ultraviolet irradiation, and gave cured products (light-shielding films) having desired light-shielding ability and excellent adhesiveness.

Components used in the examples and comparative examples are as follows:

Curable Component (Curable Compound)
  Cationically Polymerizable Compound
    EHPE3150: 1,2-Epoxy-4-(2-oxiranyl)cyclohexene adduct of 2,2-bis(hydroxymethyl)-1-butanol, Daicel Corporation
  3,4,3',4'-Diepoxybicyclohexyl
    OXT221: 3-Ethyl-3-([[(3-ethyloxetan-3-yl)methoxy]methyl)oxetane, trade name ARONE oxetane OXT221, Toagosei Co., Ltd.
  PB3600: Epoxidized polybutadiene, trade name EPOLEAD PB3600, Daicel Corporation
  Hydroxyl-containing Compound with a molecular weight of 500 or more, CD220PL: Polycarbonate diol, with a number-average molecular weight of 2000, trade name PLACCEL CD220PL, Daicel Corporation Photo-Cationic Polymerization Initiator
b-1: diphenyl[4-(phenylthiophenyl)]sulfonium tetrakis(pentafluorophenyl)borate
b-2: [1,1'-biphenyl]-4-yl[4-(1,1'-biphenyl)-4-ylthiophenyl]phenylsulfonium tetrakis(pentafluorophenyl)borate
b-3: diphenyl[4-(phenylthiophenyl)]sulfonium hexafluorophosphate Light-Shielding Material
Carbon black: trade name MA100R, Mitsubishi Chemical Corporation, with an average particle diameter of 24 nm.

INDUSTRIAL APPLICABILITY

The photosensitive resin composition according to embodiment of the present invention is particularly preferably used to form a light-shielding film or light-shielding layer in an optical component. The photosensitive resin composition according to the present invention is also usable in various applications such as printing inks, ink-jet inks, materials for photomask production, materials for proof printing production, etching resists, solder resists (solder masks), plasma display panel barrier ribs, dielectric patterns, electrode (conductor circuit) patterns, electronic component circuit patterns, electroconductive pastes, electroconductive films, and lamination of a camera cabinet with a substrate (e.g., an interposer).

The invention claimed is:

1. A photosensitive resin composition comprising components as follows:
(A) a cationically polymerizable compound at least comprising a compound containing an alicyclic epoxy group and devoid of ester bonds;
(B) a photo-cationic polymerization initiator including a cationic moiety and an anionic moiety containing a boron atom;
(C) a light-shielding material; and
(D) a hydroxyl-containing compound having a molecular weight of 500 or more, wherein the component (D) comprises at least one of a hydroxyl-containing compound having a polycarbonate skeleton in the molecule, a hydroxyl-containing compound having a polyester skeleton in the molecule, or a hydroxyl-containing compound having a polydiene skeleton in the molecule.

2. The photosensitive resin composition according to claim 1, wherein the compound containing an alicyclic epoxy group and devoid of ester bonds in the component (A) is a compound represented by Formula (a-1):

[Chem. 1]

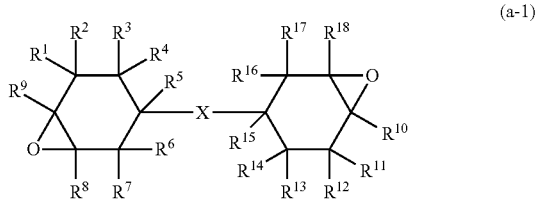

(a-1)

wherein $R^1$ to $R^{18}$ are identical or different and are independently selected from the group consisting of a hydrogen atom, a halogen atom, a hydrocarbon group optionally containing at least one of oxygen and halogen, and an optionally substituted alkoxy group; and X is selected from a single bond and a linkage group, excluding ester-bond-containing linkage groups.

3. The photosensitive resin composition according to claim 2, wherein the anionic moiety of the component (B) is an anion represented by Formula (1):

[Chem. 2]

$$[(R)_n BF_{4-n}]^- \qquad (1)$$

wherein R represents a monovalent hydrocarbon group or a monovalent fluorinated hydrocarbon group; and n represents an integer from 1 to 4.

4. The photosensitive resin composition according to claim 2, wherein the anionic moiety of the component (B) is an anion represented by Formula (2):

[Chem. 3]

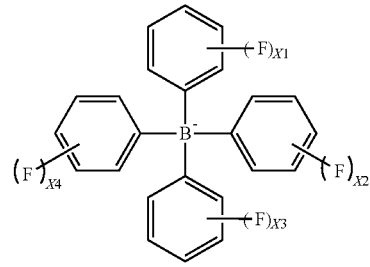

(2)

wherein X1 to X4 are identical or different, each represent an integer from 0 to 5, and the total of all of X1 to X4 is one or more.

5. The photosensitive resin composition according to claim 2, wherein the component (C) is a carbon black.

6. A cured product of the photosensitive resin composition according to claim 2.

7. The photosensitive resin composition according to claim 1, wherein the anionic moiety of the component (B) is an anion represented by Formula (1):

[Chem. 2]

$$[(R)_n BF_{4-n}]^- \qquad (1)$$

wherein R represents a monovalent hydrocarbon group or a monovalent fluorinated hydrocarbon group; and n represents an integer from 1 to 4.

8. The photosensitive resin composition according to claim 7, wherein the anionic moiety of the component (B) is an anion represented by Formula (2):

[Chem. 3]

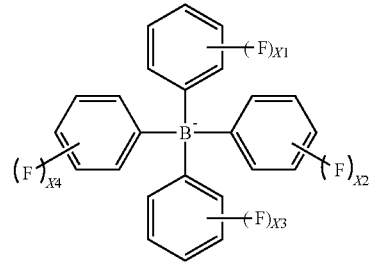

(2)

wherein X1 to X4 are identical or different, each represent an integer from 0 to 5, and the total of all of X1 to X4 is one or more.

9. The photosensitive resin composition according to claim 7, wherein the component (C) is a carbon black.

10. A cured product of the photosensitive resin composition according to claim 7.

11. The photosensitive resin composition according to claim 1, wherein the anionic moiety of the component (B) is an anion represented by Formula (2):

[Chem. 3]

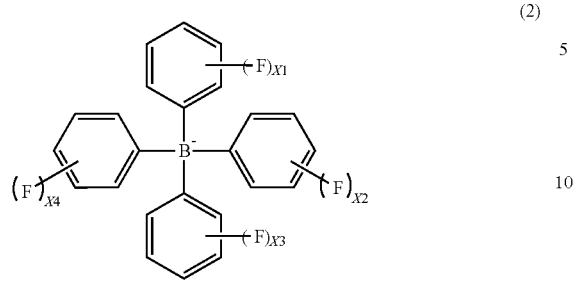

(2)

wherein X1 to X4 are identical or different, each represent an integer from 0 to 5, and the total of all of X1 to X4 is one or more.

12. The photosensitive resin composition according to claim 11, wherein the component (C) is a carbon black.

13. A cured product of the photosensitive resin composition according to claim 11.

14. The photosensitive resin composition according to claim 1, wherein the component (C) is a carbon black.

15. A cured product of the photosensitive resin composition according to claim 14.

16. A cured product of the photosensitive resin composition according to claim 1.

17. An optical component comprising the cured product according to claim 16.

* * * * *